United States Patent [19]

Lemon et al.

[11] Patent Number: 4,831,067

[45] Date of Patent: May 16, 1989

[54] PROCESS FOR THE MANUFACTURE OF FRICTIONAL ELEMENTS AND FRICTIONAL ELEMENTS PRODUCED THEREBY

[76] Inventors: Peter H. R. B. Lemon, 'Pandale', Newton Road, Sherfield, English, Romsey, Hampshire; Michael Towey, 6, Kennett Road, Halterworth, Romsey, Hampshire, both of England

[21] Appl. No.: 8,381

[22] Filed: Jan. 29, 1987

[30] Foreign Application Priority Data

Apr. 23, 1986 [GB] United Kingdom ................. 8609909

[51] Int. Cl.$^4$ .......................... C08J 5/14; C08K 3/08; C08L 61/06; C08L 77/00
[52] U.S. Cl. .................................... 523/156; 523/152; 523/155; 523/157; 524/434; 524/435; 524/439
[58] Field of Search ............... 523/155, 156, 157, 158, 523/152; 524/906, 439, 434, 435; 525/939, 508

[56] References Cited

U.S. PATENT DOCUMENTS

| | | | |
|---|---|---|---|
| 3,234,159 | 2/1966 | Cooper | 524/596 |
| 4,240,948 | 12/1980 | Huck | 528/165 |
| 4,256,623 | 3/1981 | Junger et al. | 164/43 |
| 4,369,263 | 1/1983 | Matsushima et al. | 523/155 |
| 4,373,038 | 2/1983 | Moraw et al. | 523/155 |
| 4,395,521 | 7/1983 | Chow et al. | 525/508 |
| 4,426,467 | 1/1984 | Quist et al. | 523/145 |
| 4,433,120 | 2/1984 | Chiu | 525/501 |
| 4,468,359 | 8/1984 | Lemon et al. | 523/145 |
| 4,474,904 | 10/1984 | Lemon et al. | 543/146 |

FOREIGN PATENT DOCUMENTS

| | | |
|---|---|---|
| 1065605 | 9/1959 | Fed. Rep. of Germany . |
| 1252853 | 10/1967 | Fed. Rep. of Germany . |
| 1190644 | 5/1970 | United Kingdom . |
| 1411975 | 10/1975 | United Kingdom . |
| 2050400 | 1/1981 | United Kingdom . |
| 2059972 | 4/1981 | United Kingdom . |

OTHER PUBLICATIONS

C. Blackburn et al., "Experience with Alphaset in High Alloy Steel Production", *Proceedings of 1983 Annual Conference, SCRATA*, pp. 1:2–1:7.

M. Stevenson, "Recent Developments in Cold Setting Moulding and Coremaking", *The British Foundryman;* 1981.

*Primary Examiner*—Allan M. Lieberman

[57] ABSTRACT

A method for the manufacture of shaped frictional elements is provided. The method comprises mixing a first portion of a frictional filler with from 5% to 30% of certain liquid, alkaline, phenol-formaldehyde resins; mixing a second portion of the same or a different frictional filler with a liquid ester curing catalyst for the phenyl-formaldehyde resin; intimately mixing the first and second portions; and allowing the resultant mixture to cure in a mould. A composition comprising a frictional filler, the above resin, and a curing catalyst is also provided. The disclosed method is quick and economical and is carried out at room temperature without the hazards and inconveniences associated with heated moulds.

18 Claims, No Drawings

PROCESS FOR THE MANUFACTURE OF FRICTIONAL ELEMENTS AND FRICTIONAL ELEMENTS PRODUCED THEREBY

BACKGROUND OF THE INVENTION

This invention relates to shaped frictional elements, particularly brake linings, disc pads and clutch facings and to a method of manufacturing the same which involves the use of liquid phenolic resins and catalyst set at room temperature.

In the conventional process for the manufacture of shaped frictional elements fillers such as asbestos fibres, barytes, magnesia brass or zinc filings or turnings are mixed with a binder comprising a powdered phenol formaldehyde novolak/hexamine blend and hot pressed in a mould. The action of the heat from the mould is first to fuse the binder and then to cure it.

It is, however, a disadvantage of this process that noxious gases and fumes of ammonia, formaldehyde and free phenol are evolved during the curing process. The workers need to wear gloves in order to handle the ejected cured mouldings and generally the conditions of work are very unpleasant.

It is a further disadvantage of the conventional process for the production of shaped frictional products that the expenditure of considerable energy is necessary to effect the fusion and setting of the binder.

It is known to accelerate the cure of these materials by the addition of acids or anhydrides. Many frictional materials, such as asbestos, are, however, alkaline while many of the metals included in frictional materials, while not alkaline, nevertheless react with acids. In this way much, if not all, of the accelerating effect of acids and anhydrides is vitiated when these materials are employed in an attempt to accelerate phenolic resins in bonding frictional compositions. In addition, the presence of acids is undesirable for a number of other reasons, such as their corrosive effect on metals, both in manufacture and use, and the additional handling problems, environmental effects and health risks which their use entails.

The present invention seeks to improve these aspects of production by eliminating the heat curing steps during formation of the shaped frictional materials. The reduction in energy brought about by cold curing is a substantial economic advantage of the system but there is also a reduction in wear on the moulding tool and the need for extensive ventilation is eliminated.

We have now found that shaped frictional articles can be produced quickly and economically at room temperature, without the hazards and inconveniences associated with heated moulds, by a process in which an aqueous highly alkaline phenol-formaldehyde condensation product is employed as a binder, said binder is intimately mixed with a quantity of frictional filler and subsequently with a second quantity of frictional filler which has previously been mixed with a quantity of a liquid ester sufficient to effect cure of the phenolic resin.

These compositions set at room temperature and therefore demand less energy than the heat cured systems previously used. The low curing temperature results in the substantial elimination of noxious fumes and the hazards associated with the handling of heated moulds. Being free from acidic materials, corrosion problems are greatly reduced or eliminated. In addition, because they are catalyzed by alkalies, they set in the presence of alkaline fillers such as asbestos.

SUMMARY OF THE INVENTION

Accordingly the present invention comprises a method for the manufacture of shaped frictional elements which comprises mixing frictional filler with from 5% to 30% of a liquid, alkaline, phenol-formaldehyde resin having a formaldehyde to phenol molecular ratio between 1:1 and 3.5:1, a weight average molecular weight between 300 and 4000 and a pH greater than 10, mixing a second portion of the same or a different frictional filler with a liquid ester curing agent for the phenol-formaldehyde resin, intimately mixing the two portions together and allowing the resultant mixture to cure in a mould.

The invention also comprises a composition suitable for the manufacture of brake linings, pads and clutch facings which comprises a major proportion of frictional filler or a mixture of frictional fillers, from 5% to 30% of a liquid, alkaline, phenol-formaldehyde resin with a formaldehyde to phenol molar ratio between 1:1 and 3.5:1, a weight average molecular weight of from 300 to 4000 and a pH value above 10 and from 10% to 110% on the weight of the resin of an ester as catalyst therefor.

The invention further comprises a shaped frictional article produced by the above process.

DETAILED DESCRIPTION OF THE INVENTION

Liquid alkaline phenol-formaldehyde resins suitable for use in the present invention are those in which the formaldehyde to phenol ratio is within the range 1:1 to 3.5:1 and preferably within the range 1.5:1 to 2.2:1.

The alkali used may be sodium hydroxide or potassium hydroxide or a mixture of these with alkaline earth oxides such as calcium hydroxide, barium, oxide, magnesium oxide, etc. We have found that potassium hydroxide gives the best performance.

The proportion of alkali in the composition may vary with the molar ratio of formaldehyde to phenol, the molecular weight of the resin, the nature of the alkali and the nature of the frictional material employed but must be sufficient in quantity and nature to impart to the resin a pH value above 10. Preferably the resin will have a pH value of 11 to 13. This can normally be achieved using an alkali to phenol ratio within the range from 0.1:1 to 5:1. It will be obvious to those skilled in the art to adjust the quantity of alkali to obtain satisfactory results and this may be necessary to compensate for the effects of the frictional components employed.

The weight average molecular weight ($M_w$) of the resin must be high enough to allow gelation to occur, i.e., above 300. On the other hand, both storage stability and final strengths will tend to fall with increase in molecular weight and products with molecular weights in excess of 4000 ($M_w$) are generally unsuitable. The preferred products are those with molecular weights within the range 600 to 1700 ($M_w$).

If desired, the solids content of the resin may be adjusted, for example, by distillation, but this is not usually necessary and the savings in time and energy thereby achieved constitute a further advantage of the invention.

The frictional fillers employed in the present invention may be any of the fillers normally employed in the brake lining industry for the production of linings, pads, clutch facings, etc. Of particular interest are the non-asbestos fillers: copper powder, iron wool, iron powder, friction dust, graphite, barytes, etc., since they are becoming more widely used as the industry changes away from asbestos for environmental pollution reasons. Another suitable filler is Kevlar (trademark of DuPont) polyaramide fibers. The alkaline phenolic resins do not react with fillers of this nature.

The curing catalyst used in the invention is an ester. Suitable esters include low molecular weight lactones, e.g., gamma butyrolactone, propiolactone, valerolactone and caprolactone, and esters of short and medium chain (e.g., C1–C10) fatty acids with aliphatic mono- or polyhydroxy alcohols of chain lengths C1–C10.

The amount of catalyst used can be as low as 10% and as high as 110% of the liquid resin depending upon the molecular weight of the ester and the degree of acceleration required. Preferably the amount of ester is from 15% to 40% by weight of the weight of liquid resin solution used.

A silane is preferably included in the phenolic resin to promote adhesion to the frictional fillers and thus increase the strengths of the final cured frictional element. Amounts as low as 0.05% by weight of the weight of liquid resin have some effect, while little, if any, additional strength is gained from the addition of amounts in excess of 5%. Consequently, we prefer to employ a silane in an amount between 0.50% and 5% on the weight of the liquid resin and an amount between 0.2% and 1.5% is found to be particularly effective.

Although gamma aminopropyl triethoxy silane is the preferred material, other silanes may be substituted either wholly or in part.

The following examples illustrate the present invention.

Manufacture of phenol formaldehyde resin solution A 94 grams of 100% phenol were dissolved in 67.3 grams of a 50% aqueous solution of potassium hydroxide. The solution was heated to reflux and 120 grams of 50% aqueous formaldehyde, corresponding to a phenol:formaldehyde molar ratio of 1:2, were added slowly, while maintaining reflux. The reaction mixture was maintained under reflux until it attained a predetermined viscosity corresponding to a weight average molecular weight of 1400. The resin solution was cooled to 40° C. and 0.4% by weight on the weight of the resin solution of gamma-aminopropyl triethoxysilane added.

Manufacture of phenol formaldehyde resin solution B 94 grams of 100% phenol were dissolved in 85.3 grams of a 50% aqueous solution of potassium hydroxide. The solution was heated to reflux and 96 grams of 50% aqueous formaldehyde, corresponding to a phenol:formaldehyde molar ratio of 1:1.6, were added slowly, while maintaining reflux. The reaction mixture was maintained under reflux until it attained a predetermined viscosity corresponding to a weight average molecular weight of 1500. The resin solution was cooled to 40° C. and 0.4% by weight on the weight of the resin solution of gamma-aminopropyl triethoxysilane added.

Testing of Resins (A) Viscosity—measured using an Oswald (U-tube) viscometer at 25°

(B) Solids content—measured by heating a weighed sample (2.0±0.1 g) in an air circulating oven for 3 hours at 100° C.

(C) Molecular weight ($M_w$)—measured using gel permeation chromatography. Samples were prepared by dissolving the resin in tetrahydrofuran, neutralizing the resin solution by adding sulphuric acid and separating the tetrahydrofuran solution used for the determination.

Table 1 shows the parameters for two resins, hereinafter referred to as Resin A and Resin B, prepared for evaluation:

TABLE 1

| Alkaline phenolic resin composition | | | | | |
|---|---|---|---|---|---|
| Designation of resin | P:F molar ratio | pH value | Solids content (3 h, 100° C.) | Viscosity cSt at 25° C. | Molecular weight $M_w$ |
| Resin A | 1:2 | 11.8 | 63 | 150 | 1400 |
| Resin B | 1:1.6 | 12.2 | 60 | 150 | 1500 |

Example 1

(a) A filler blend was prepared or iron fillings, iron wool and barytes and 1275 g of this blended for 5 minutes with 152 g of the resin Resin A. The resin was sprayed into the double Z mill from a spray gun to avoid the formation of lumps.

(b) A second run of 1275 g of filler blend and 121 g of butyrolactone was prepared in a similar manner. 100 g of (a) and 50 g (b) were placed into a 1 lb lever lid tin and shaken vigorously for 30 seconds and placed into a disc pad mould at room temperature (20° C.) in a press. The metal backing plate had been placed in the mould. The pressure was applied 50–55 seconds from the time of initial blending.

Pressure was relaxed after 3 minutes. All mouldings were sound on ejection and material had flowed sufficiently to fill the holes in the backing plates perfectly.

Shore R hardness varied with applied pressure 13 at 1 tonne per square inch pressure 21 at 2 tonnes per square inch pressure Both measured immediately after stripping. These pads were post cured for 16 hours at 200° C. and then subjected to Girling type 16M brake rig tests. Results showed great promise.

Example 2

Further pads were produced to the formulation of Example (1) with the following variations.

| 12/8955 | 7% resin B (dry weight) |
| | 3:1 resin B:butyrolactone |
| 12/8956 | 7% resin B |
| | 4:1 resin B:butyrolactone |
| 12/8957 | 10% resin B |
| | 3:1 resin B:butyrolactone |

These pads were tested on Girling type 16M brake test rig against a standard phenolic powdered resin/hexa system based on the same fillers and resin loading (solid dry weight) and equivalent frictional performance was obtained.

The results were sufficiently promising to install some of the pads made with mix 12/8957 in a test car. Test track results were reported as satisfactory in comparison with the performance normally expected from heat-cured, novolak/hexa bonded pads.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A method for the manufacture of a shaped frictional element, comprising:
   (a) mixing a first portion of a frictional filler with from 5% to 30% of a liquid, alkaline, phenol-formaldehyde resin having a formaldehyde:phenol molecular ratio between 1:1 to 3.5:1, a weight average molecular weight (Mw) between 300 and 4,000 and an alkali metal hydroxide to phenol molar ratio of from 0.1:1 to 5:1, and a pH greater than 10;
   (b) mixing a second portion of the same or a different frictional filler with an effective amount of a liquid ester curing catalyst for the resin of step (a);
   (c) intimately mixing said first and second portions together to form a mixture; and
   (d) allowing the resultant mixture to cure in a mold.

2. The method of claim 1 wherein the $M_w$ of the resin of step (a) is from 600 to 1700.

3. The method of claim 2 wherein the alkali metal hydroxide of step (a) comprises potassium hydroxide.

4. The method of claim 1 wherein the liquid ester curing catalyst of step (b) is a low molecular weight lactone or an ester of a C1–10 aliphatic mono- or polyhydroxy alcohol with a C1–10 fatty acid.

5. The method of claim 4 wherein the liquid ester curing catalyst is selected from the group consisting of gamma butyrolactone, propiolactone, valerolactone, caprolactone, and esters of a C1–10 aliphatic mono- or polyhydroxy alcohol with a C1–10 fatty acid.

6. The method of claim 1 wherein the frictional fillers of steps (a) and (b) is selected from the group consisting of iron filings, copper powder, iron wool, iron powder, iron particles, graphite, barytes, polyaramide fibers, and mixtures thereof.

7. The method of claim 1 wherein the frictional fillers of steps (a) and (b) are the same.

8. The method of claim 1 wherein the frictional fillers of steps (a) and (b) are each a mixture comprising iron filings, iron wool, and barytes.

9. The method of claim 1 wherein said first portion additionally comprises a silane in an amount that provides an increase in strength in a cured functional element.

10. The method of claim 9 wherein said silane is gamma aminopropyl triethoxy silane.

11. A composition suitable for the manufacture of brake linings, brake pads, and clutch facings comprising:
    (a) a major portion of (frictional) filler selected from the group consisting of copper powder, iron wool, iron powder, iron filings, and mixtures thereof;
    (b) from 5% to 30% of a liquid, alkaline, phenol-formaldehyde resin having a formaldehyde to phenol molecular ratio of between 1:1 to 3.5:1, a weight average molecular weight ($\overline{M}_w$) of from 300 to 4000, and an alkali metal hydroxide to phenol molar ratio of from 1:1 to 5:1, and a pH greater than 10; and
    (c) from 10% to 110% based on the weight of the resin of an ester curing catalyst.

12. The composition of claim 11 wherein the $M_w$ of the resin of (a) of claim 11 is from 600 to 1700.

13. The composition of claim 12 wherein the alkali metal hydroxide of (a) of claim 11 comprises potassium hydroxide.

14. The composition of claim 11 wherein the liquid ester curing catalyst of (c) is a low molecular weight lactone or an ester of a C1–10 aliphatic mono- or polyhydroxy alcohol with a C1–10 fatty acid.

15. The composition of claim 14 wherein the liquid ester curing catalyst is selected from the group consisting of gamma butyrolactone, propiolactone, valerolactone, caprolactone, and esters of a C1–10 aliphatic mono- or polyhydroxy alcohol with a C1–10 fatty acid.

16. The composition of claim 11 wherein said resin portion (b) additionally comprises a silane in an amount that provides an increase in strength in a cured functional element.

17. The composition of claim 16 wherein said silane is gamma aminopropyl triethoxy silane.

18. A shaped frictional article produced by the process of claim 1.

* * * * *

UNITED STATES PATENT AND TRADEMARK OFFICE
CERTIFICATE OF CORRECTION

PATENT NO. : 4,831,067

DATED : May 16, 1989

INVENTOR(S) : Peter H.R.B. Lemon

It is certified that error appears in the above-identified patent and that said Letters Patent is hereby corrected as shown below:

On the title page, Item [73] should read -- Borden, Inc., Columbus, OH

Signed and Sealed this

Third Day of April, 1990

Attest:

HARRY F. MANBECK, JR.

*Attesting Officer*   *Commissioner of Patents and Trademarks*